United States Patent
Wurman et al.

(10) Patent No.: US 11,745,109 B2
(45) Date of Patent: Sep. 5, 2023

(54) METHODS FOR CONTROLLING USE OF COMPUTING RESOURCES, SUCH AS VIRTUAL GAME CONSOLES

(71) Applicants: Sony Group Corporation, Tokyo (JP); Sony Corporation of America, New York, NY (US); Sony Interactive Entertainment LLC, San Mateo, CA (US)

(72) Inventors: Peter Wurman, Acton, MA (US); Leon Barrett, Portland, OR (US); Piyush Khandelwal, Austin, TX (US); Dion Whitehead, San Diego, CA (US); Rory Douglas, Baltimore, MD (US); Houmehr Aghabozorgi, San Diego, CA (US); Justin V Beltran, San Mateo, CA (US); Rabih Abdul Ahad, San Mateo, CA (US); Bandaly Azzam, San Mateo, CA (US)

(73) Assignees: SONY GROUP CORPORATION, Tokyo (JP); SONY CORPORATION OF AMERICA, New York, NY (US); SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/650,287

(22) Filed: Feb. 8, 2022

(65) Prior Publication Data

US 2023/0249083 A1 Aug. 10, 2023

(51) Int. Cl.
*A63F 13/67* (2014.01)
*A63F 13/352* (2014.01)

(52) U.S. Cl.
CPC ............ *A63F 13/67* (2014.09); *A63F 13/352* (2014.09); *A63F 2300/531* (2013.01); *A63F 2300/6027* (2013.01)

(58) Field of Classification Search
None
See application file for complete search history.

(56) References Cited

U.S. PATENT DOCUMENTS 11,161,046 B2 * 11/2021 Slovak ..................... A63F 13/67
2017/0195251 A1 7/2017 Bruno et al.
(Continued)

FOREIGN PATENT DOCUMENTS

CN 113018848 A 6/2021
WO 2019113502 A2 6/2019

OTHER PUBLICATIONS

Rajkumar Buyya et al.: "Cloud Computing Principles and Paradigms" In: "Cloud Computing Principles and Paradigms", Mar. 29, 2011 (Mar. 29, 2011), vol. 978, pp. 0-41, XP055219543.
(Continued)

*Primary Examiner* — Reginald A Renwick
(74) *Attorney, Agent, or Firm* — INNOVATION CAPITAL LAW GROUP, LLP; Vic Lin (57) ABSTRACT

An artificial intelligent agent can act as a player in a video game, such as a racing video game. The game can be completely external to the agent and can run in real time. In this way, the training system is much more like a real world system. The consoles on which the game runs for training the agent are provided in a cloud computing environment. The agents and the trainers can run on other computing devices in the cloud, where the system can choose the trainers and agent compute based on proximity to console, for example. Users can choose the game they want to run and submit code which can be built and deployed to the cloud system. A resource management service can monitor
(Continued)

game console resources between human users and research usage and identify experiments for suspension to ensure enough game consoles for human users.

18 Claims, 3 Drawing Sheets

(56) References Cited

U.S. PATENT DOCUMENTS

| | | |
|---|---|---|
| 2018/0203629 A1 | 7/2018 | Poornachandran et al. |
| 2018/0357152 A1 | 12/2018 | Browne |
| 2019/0354759 A1 | 11/2019 | Somers et al. |
| 2020/0171382 A1* | 6/2020 | Agoston ............... A63F 13/355 |
| 2020/0179808 A1 | 6/2020 | Lee et al. |
| 2020/0314171 A1 | 10/2020 | Featonby et al. |
| 2021/0220733 A1 | 7/2021 | Zimring et al. |

OTHER PUBLICATIONS

Righi Rodrigo Da Rosa et al: "AutoElastic: Automatic Resource Elasticity for High Performance Applications in the Cloud", IEEE Transactions on Cloud Computing, IEEE Computer Society, USA, vol. 4, No. 1, Jan. 1, 2016 (Jan. 1, 2016), pp. 6-19, XP011609250.

Yang Yu et al: "A Feather-weight Virtual 19 Machine for Windows Applications", Virtual Execution Environments, ACM, 2 Penn Plaza, Suite 701 New York NY 10121-0701 USA, Jun. 14, 2006 (Jun. 14, 2006), pp. 24-34, XP007902018.

Hong et al., "Placing Virtual Machines to Optimize Cloud Gaming Experience", IEEE Transactions on Cloud Computing (vol. 3, Issue: 1, Jan.-Mar. 1, 2015), 13 pages.

* cited by examiner

METHODS FOR CONTROLLING USE OF COMPUTING RESOURCES, SUCH AS VIRTUAL GAME CONSOLES

BACKGROUND OF THE INVENTION

1. Field of the Invention

Embodiments of the invention relates generally managing the use of electronic computing resources. More particularly, the invention relates to methods for managing the use of cloud-based gaming consoles to permit both research and human gaming use thereof.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Video game players often desire to improve their game through practice and playing against other players. However, once a game player develops exceptional skills in a given game, the availability of suitable challengers greatly decline. While such players may be able to improve their game by playing against less skilled players, it is usually more helpful to play against a player that can provide a significant challenge.

Many games provide game-provided players that can participate. However, these players may simply be following certain programming that a skillful player can figure out and defeat.

In view of the foregoing, there is a need for a method for training an artificial intelligent agent on cloud-based gaming consoles to have the ability to challenge even the best skilled video game players while managing computing resources so that human players are not affected by the artificial intelligent agent research, development and training.

SUMMARY OF THE INVENTION

Embodiments of the present invention provide a method for managing computing resources between human users and research users comprising providing a resource management service for the computing resources, the resource management service including: a first resource management module measuring load due to human activity; a second resource management module predicting future load due to human activity; and a third resource management module determining the computing resources given to the research users; and providing a resource control service for the computing resources, the resource control service including: a first resource control module reading a number of computing resources available; and a second resource control module identifying one or more experiments to suspend; and moving the one or more experiments identified to suspend into a <suspending> state.

Embodiments of the present invention further provide a method for training an artificial intelligent agent to play a video game on a cloud-based game console shared with human users comprising providing the artificial intelligent agent to interact in the video game; configuring trainers to review experiences from the artificial intelligent agents and improve policies for the artificial intelligent agents for interacting with the video game; reviewing code for the artificial intelligent agents, the trainers and an experiment definition program with a local source code repository and creating a docker image thereof; mirroring the local source code control service with a console system source code control service within a game console system build environment and building a docker image for an experiment; monitoring a state of the experiment with a resource control service and determining whether to run the experiment once the experiment is in a scheduling state; starting the experiment on a predetermined number of the cloud-based game consoles, with a predetermined number of the data gatherers, at one or more predetermined environments; providing a resource management service for monitoring an amount of the cloud-based game consoles available at each of the environments, the resource management service including: a first resource management module measuring load due to activity of the human users on the cloud-based game consoles at each of the environments; a second resource management module predicting future load due to activity of the human users; and a third resource management module determining the cloud-based game consoles given to the research users; reading, by the resource control system, a number of the cloud-based game consoles available; identifying, by the resource control system, one or more experiments to suspend; and moving the one or more experiments identified to suspend into a <suspending> state.

Embodiments of the present invention also provide a method for managing computing resources of cloud-based game consoles between human users and research users comprising providing a resource management service for the computing resources, the resource management service including: a first resource management module measuring load due to human activity; a second resource management module predicting future load due to human activity; and a third resource management module determining the computing resources given to the research users; and providing a resource control service for the computing resources, the resource control service including: a first resource control module reading a number of computing resources available; and a second resource control module identifying one or more experiments to suspend; moving the one or more experiments identified to suspend into a <suspending> state; assigning the resource control service at each environment containing the cloud-based game consoles, wherein each resource control service monitors for the one or more experiments in the <suspending> state; terminating each process under control of the resource control service for the one or more experiments in the <suspending> state; changing a status of each process under control of the resource control service to a <suspended> state when each process under control of the resource control service is terminated; and changing the one or more experiments to a <suspended> state when each of the resource control service at each environment containing the computing resources has its respective processes for the one or more experiments in the <suspended> state.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

A "computer" or "computing device" may refer to one or more apparatus and/or one or more systems that are capable of accepting a structured input, processing the structured input according to prescribed rules, and producing results of the processing as output. Examples of a computer or computing device may include: a computer; a stationary and/or portable computer; a computer having a single processor, multiple processors, or multi-core processors, which may operate in parallel and/or not in parallel; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" or "application" may refer to prescribed rules to operate a computer. Examples of software or applications may include code segments in one or more computer-readable languages; graphical and or/textual instructions; applets; pre-compiled code; interpreted code; compiled code; and computer programs.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASHEEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G, 4G, 5G and the like.

Embodiments of the present invention may include apparatuses for performing the operations disclosed herein. An apparatus may be specially constructed for the desired purposes, or it may comprise a general-purpose device selectively activated or reconfigured by a program stored in the device.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device.

The term "agent" or "intelligent agent" or "artificial agent" or "artificial intelligent agent" is meant to refer to any man-made entity that chooses actions in response to observations. "Agent" may refer without limitation to a robot, to a simulated robot, to a software agent or "bot", an adaptive agent, an internet or web bot.

Broadly, embodiments of the present invention provide an artificial intelligent agent can act as a player in a video game, such as a racing video game. The game can be completely external to the agent and can run in real time. In this way, the training system is much more like a real world system. The consoles on which the game runs for training the agent are provided in a cloud computing environment. The agents and the trainers can run on other computing devices in the cloud, where the system can choose the trainers and agent compute based on proximity to console, for example. Users can choose the game they want to run and submit code which can be built and deployed to the cloud system. A resource management service can monitor game console resources between human users and research usage and identify experiments for suspension to ensure enough game consoles for human users.

Referring to FIGS. 1 through 4, the basic workflow can be envisioned as follows.

On a User's Local Machine

Figure 1:
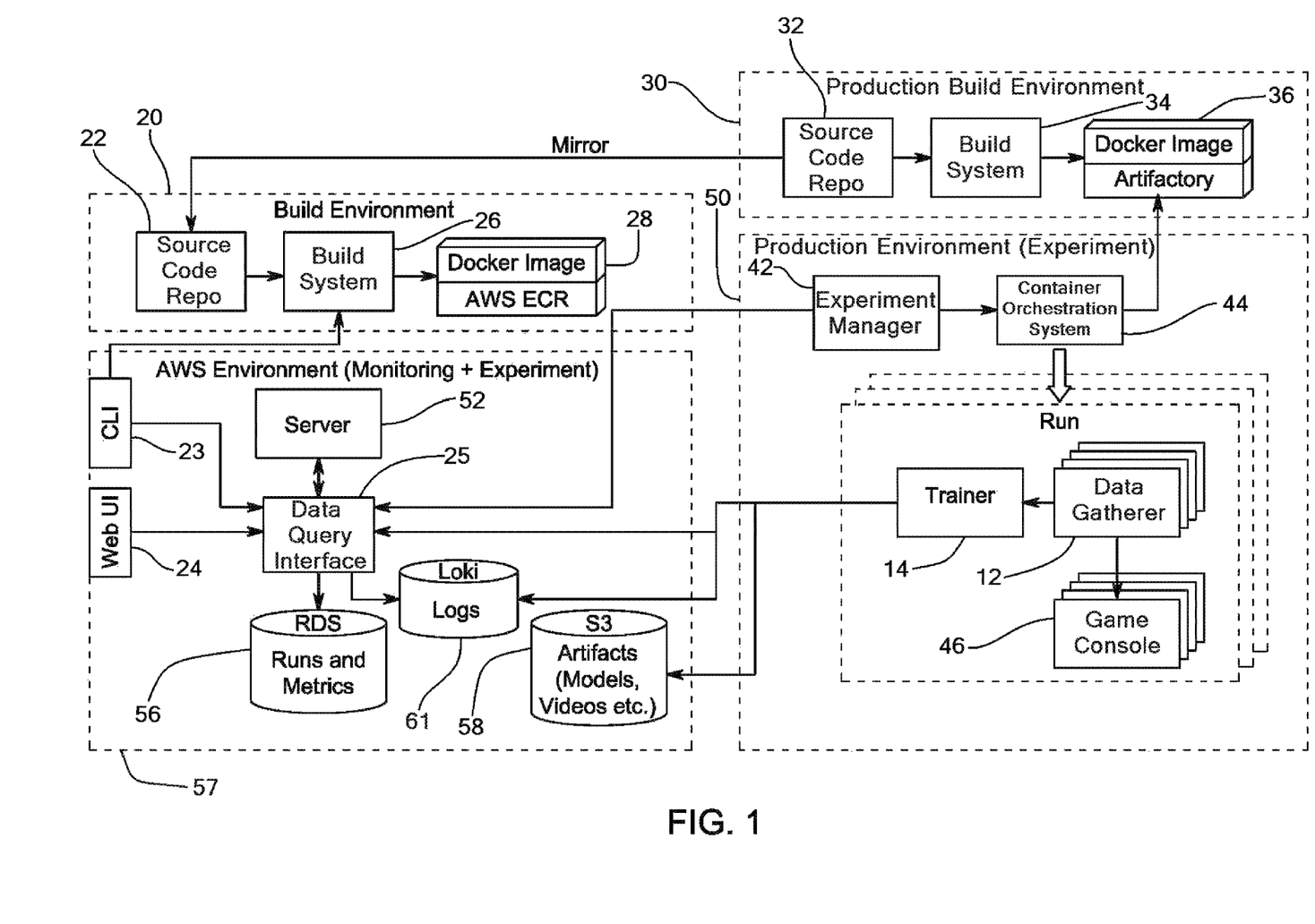
FIG. 1 illustrates an exemplary system architecture for training agents using game consoles according to an embodiment of the present invention.

On the user's local machine 10, the user can write a computer program (usually in Python, for example) for the agent. This program is called a "data gatherer" 12 and such an agent can be programmed to know how to interact with and control a game. The user can further write a computer program (usually in Python, for example) for the "trainer" 14. The trainer 14 can be programmed to know how to take experiences from data gatherers 12 and use them to improve policies for the agent (data gatherer 12). The trainer 14 may use any number of algorithms and neural network structures as may be present in an artificial intelligence (AI) library 16. The user can write a third program which defines the experiment 18. This program is typically in the form of a configuration file, written in, for example, a human-readable data-serialization language, such as YAML, that can define how many data gatherers 12 to use, how much computing power is needed for the data gatherers 12 and trainers 14, what algorithms the trainer 14 should use, the set of tasks for the trainer 14 to put the data gatherers 12 through, and the like.

The user can check in their code (data gatherer 12, trainer 14 and experiment definition 18) to a source code repository, such as GitHub 22. The user can run a command line program, via a command line interface 23, that submits a request to the build system 26 in build environment 20 to build the experiment if no existing docker image can be reused. The user then tells server 52, in the monitoring environment 57, via data query interface 25, asking it to run the experiment identified by its source code check-in reference hash. The system server 52 can store information about the requested experiment in a database 56 with the state <submitted>. In some embodiments, there may also be a web interface 24 that lets a user request a run. As shown in FIG. 1, the web interface 24 and command line interface 23 can interact with a data query and manipulation interface 25, such as Hasura/GraphQL, to permit the user to review experiments during or after their execution, as discussed below. Of course, other query interfaces may be utilized for the review of data by the user.

In the Cloud

Figure 2:
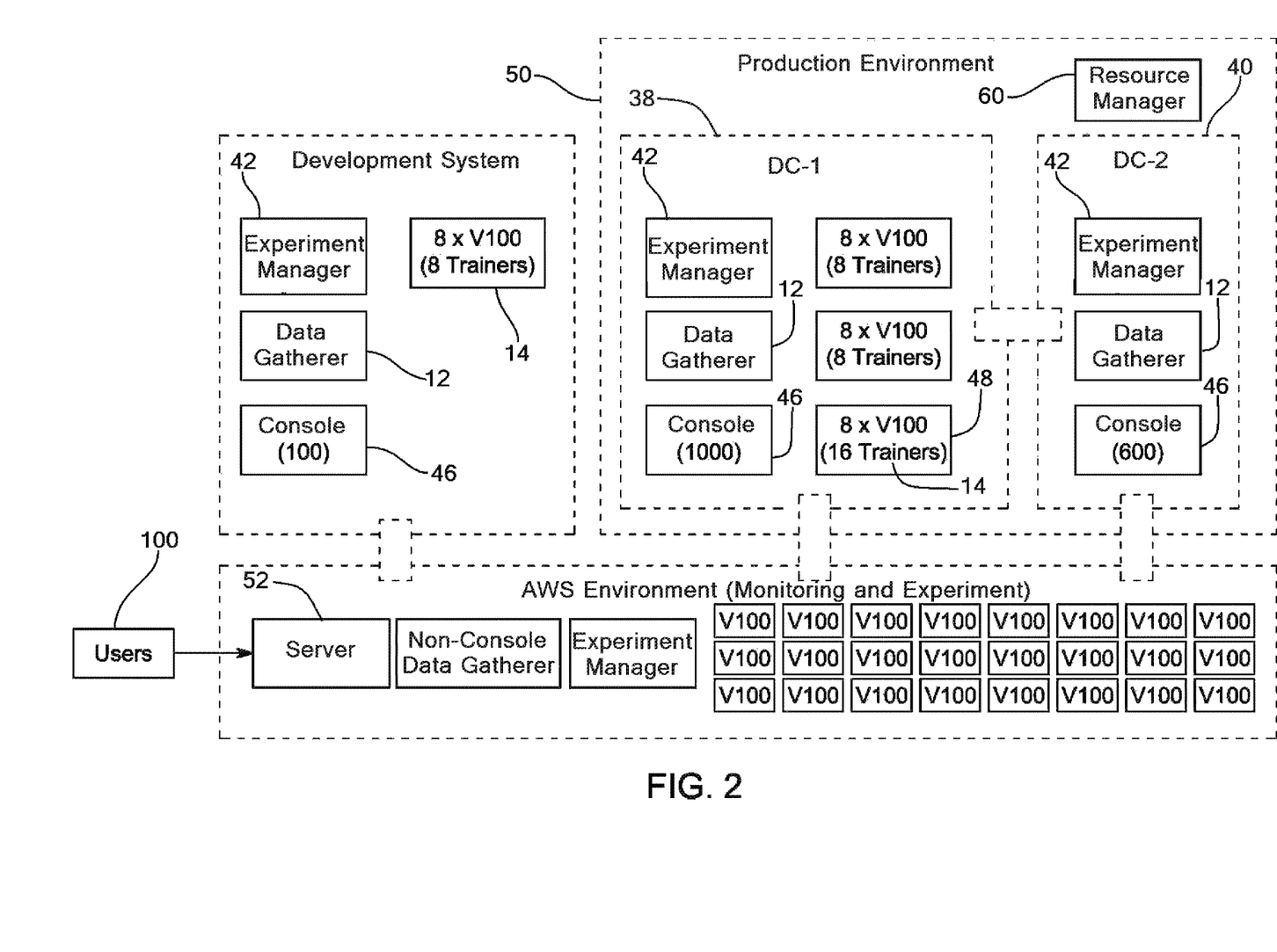
FIG. 2 illustrates resources used in the system architecture of FIG. 1.
Figure 3:
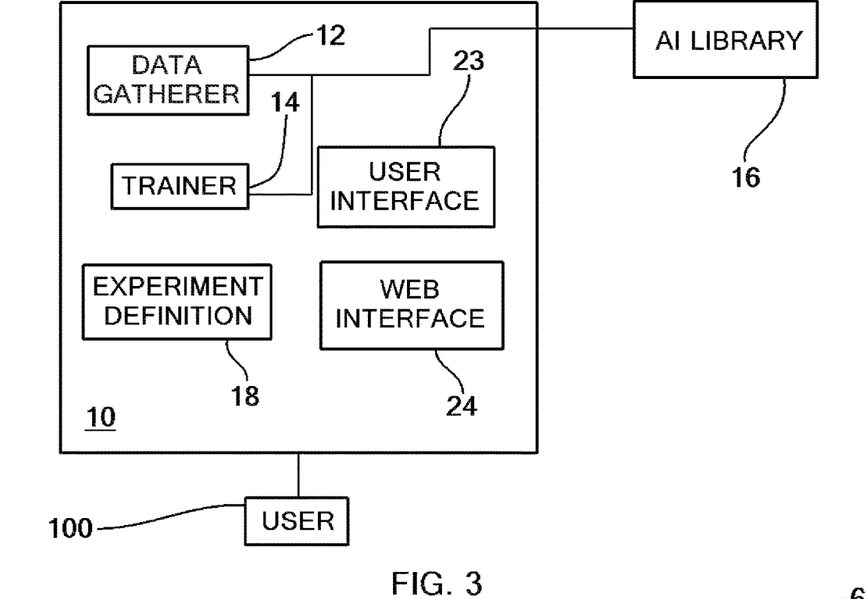
FIG. 3 illustrates a schematic representation of a user computing device used in the architecture and methods according to exemplary embodiments of the present invention.

In the cloud computing environment, a build system 26 can build the user's code into a docker image 28. The build system 26 can be any virtual machine imaging system, such as CircleCI, for example. If the experiment requires resources from the cloud game system 30 (also referred to as production build environment 30), the production build environment 30 can pull code from the development build environment 20, where their build system can run a variety of secondary security evaluations with a source code repository 32, such as GitLab, and then also build the user's code with a docker build 34 into a docker image 36. The system can set the experiment state to <building> and record which environment (such as data center DC-1 (environment 38) and data center DC-2 (environment 40), as shown in FIG. 2) are building it. While the description herein describes using a docker image and FIG. 1 illustrates Kubernetes 44 as a container orchestration system for interfacing with the docker image 36, it should be understood that other types of architecture may be used to obtain the same purpose. For example, the docker runtime may be replaced by a runtime that is compliant with the container runtime interface of Kubernetes. Similarly, container orchestrations system Kubernetes can be replaced with other orchestration systems like Slurm.

Periodically, the resource control service 42 in each environment 38, 40 can look at the build system 30 in its view and look for building experiments. When one completes, the resource control service 42 can transition the experiment state in its environment to a <built> state. The system can watch for the transitions to <built> in each environment and once all required environments are done, can change the overall experiment state to <built>. The system can watch for experiments in the <built> stage and transfers them to a <queued> state.

Periodically, the system can evaluate the experiments in the <queued> state and can make decisions about whether an experiment should be started. When deciding whether an experiment should start, the system can consider the priority level of the experiment, the age of the experiment, whether the resources the experiment requires are available in any acceptable environment, and other such criteria for scheduling the experiment, such as quota limits by user or project, and the like.

If the system decides to start an experiment, it can mark the experiment as <scheduling> and can tag the experiment with identifiers for the resources it should consume. For example, the system may decide that a particular experiment should be run with game consoles 46 (such as PS4's, for example) and with data gatherers 12 in a particular environment 38, 40. The experiment can be run using a GPU (such as V100 GPUs 48) for the trainers 14 in the same or different environment and will add annotations to the experiment to record those decisions.

Periodically, the resource control service 42 in each target environment can look at whether there are experiments in the <scheduling>state that are tagged to start in its environment 38, 40. If so, it can start the required resources.

When a Data Gatherer Starts

Technically, a data gatherer can be any program. In the context of embodiments of the present invention, the data gatherer 12 can be one that is playing a game (such as a PlayStation® game) within the network of the cloud game system production environment 50.

The data gatherer 12 can find the trainer 14 it is working with as specified by the system server 52 and connect to it. The data gatherer 12 can request a game system user ID from a service that manages user IDs for training agents. The data gatherer 12 requests an available console 46 in the cloud gaming system 50 and also requests a particular game be loaded.

The data gatherer 12 can then request a task from the trainer 14. Tasks are essentially configurations of the game that it should play. For example, in a racing game, one task might have the data gatherer 12 start clusters of five cars spaced evenly around the track in which each cluster contains one car controlled by the agent and three cars controlled by the game's built-in AI.

The data gatherer 12 can start the game, communicate the scenario configuration to the game, and then start playing. As the agent plays the game, it can send its experiences to the trainer 14.

Periodically, the data gatherer 12 can fetch updated models from the trainer 14. Optionally, the data gatherer 12 may also send metrics to the database 56 via data query interface 25 during or after the scenario. For example, the data gatherer 12 may report its best lap time. Optionally, the data gatherer 12 may store other data, such as complete race data, in a remote data store 58, such as S3. Optionally, the data gatherer 12 may configure the video output of the cloud game console to stream to S3 so it can be viewed later by the experimenter.

When the task termination criteria are met, the data gatherer 12 can terminate the scenario on the cloud game console 46 and can request a new task from the trainer 14.

When a Trainer Starts

The trainer 14 can initialize a buffer where it can store experiences reported by the data gatherers 12. Optionally, a buffer from a previous run can be loaded. The trainer 14 can maintain a list of tasks from which it hands out new tasks to data gatherers 12 when they request one.

Periodically, the trainer 14 loads experiences from the buffer and uses learning algorithms to update the neural network models. Optionally, the trainer 14 will report metrics to the system, where such metrics are stored in the metrics database 56. Updated neural network models can be sent to the data gatherer 12.

On the User's Machine

While an experiment is building and running, the user can monitor it using, for example, a web browser 24 connected to the system server 52 via data query interface 25. The system interface can show the progress through the experiment building and deployment stages. Once the experiment is running, the system interface can allow the user to inspect metrics and create dashboards displaying various graphs of performance. The system interface can also be used to graph metrics across multiple runs at the same time to allow users to compare the performance of different experiments.

Suspend and Resume

Figure 4:
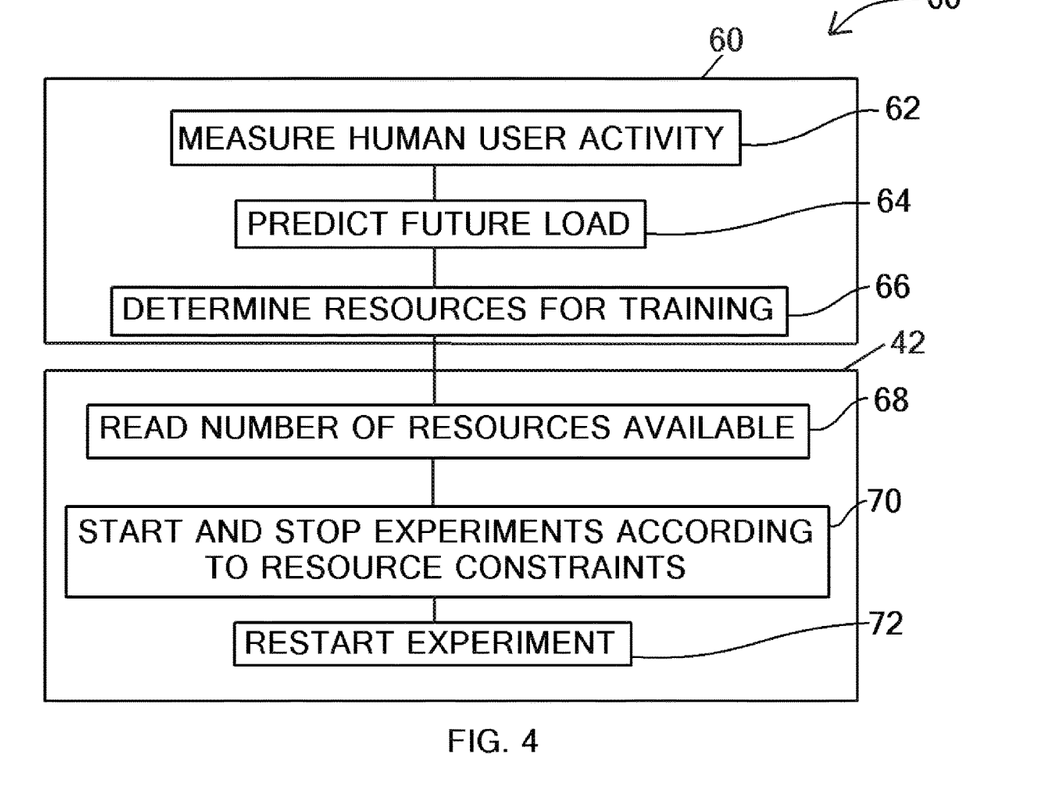
FIG. 4 illustrates modules provided by a resource management service and a resource control service for controlling resource use in the architecture and methods according to exemplary embodiments of the present invention.

The resource management service 60, also referred to simply as resource manager 60, is the name of the service that the cloud game system has to coordinate resources with external services. Because the training is performed on actual game consoles, the training system shares the game system (such as the PlayStation® network) with humans. When more humans want to play games, resource management service 60 tells the training system 50 to scale back usage. When humans stop playing, resource management service 60 gives the training system 50 more resources. System server 52 makes use of resource control service 42, also referred to as experiment manager 42, to make adjustments in resource use based on targets set by the resource management service 60.

As discussed in greater detail below, some key features of the integration of the training system with the cloud game system are as follows: (1) a module 62 that measures load due to human activity; (2) a module 64 that predicts future load; and (3) a module 66 that determines how many of those resources can be given to researchers. The resource control service 42 can provide the following features, including (4) a module 68 that reads the number of resources available; (5) a module 70 that starts and stops experiments according to the resource constraints and the priorities/age/quotas of the job; and (6) a module 72 that restarts jobs in environments where resources are available. Modules 70 and 72 may be part of the system server 52. In some embodiments, an experiment can be run in multiple environments, while the resource control service 42 (the experiment manager 42) only controls resources in one environment. In some embodiments, for example, if the system server 52 does not act, or does not act quickly enough, the resource management service 60 may end experiments according to a pre-programmed protocol, such as first-in, first-out, for example.

The training system can monitor the cloud game system's resource management service 60. When the system notices that the resources (especially cloud game consoles) allocated to the training system have decreased below the system current usage, the system can identify one or more experiments to suspend. When deciding which experiments to suspend, the system may consider location of the resources in use by the experiment, priority level of the experiment, age of the experiment, user ID of the experiment and/or other attributes on the experiment. The system can move the selected experiment into a <suspending> state.

Each resource control service 42 in each environment (such as locations 38, 40) can periodically check the system server to see if an experiment they are running has moved into a <suspending> state. If so, the resource control service can terminate the processes under their control. When a trainer is asked to suspend, it can save state information (particularly its experience buffer) to remote storage so that it can be reloaded later before gracefully shutting down.

Once all of the processes under their control are terminated, the resource control service 42 will change their portion of the experiment to a <suspended> state.

When all of the relevant resource control services 42 have transitioned their portions to <suspended>, the system can transition the whole experiment to a <suspended> state.

When the system sees in the resource control service 42 that the number of available resources is greater than the number of resources in use, the system can look at the list of runs that are suspended. The system may restart some of these experiments.

The choice about which experiments to restart may consider location of the resources in use by the experiment, priority level of the experiment, age of the experiment, user ID of the experiment and/or other attributes on the experiment.

To avoid thrashing, the system server may smooth the signals about resource availability that it receives from the resource management service 60. It may smooth these signals by applying any number of standard algorithms, like low-pass filters, min-max time windows, or the like. Optionally, the user can click a button to suspend an experiment that is running. This experiment will move to the <manually suspended> state. The user may choose to reactivate a manually suspended experiment by pressing a button in the user interface. The system will move the experiment to <suspended>.

The system will then reactivate the experiment when resources are available, subject to the same conditions as above.

Completion

A user may write termination conditions into their trainer script so that when certain conditions are met, it will report that it completed to the system and then terminate. The system will change the experiment state to <success>. Alternatively, the user may use the system's interface to click the "Cancel" button. The system will shut down the experiment immediately following a process similar to the suspend process discussed above, but without saving the current experiment state. The system will set the experiment state to <canceled>.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

The invention claimed is:

1. A method for managing computing resources between human users and research users to ensure a sufficient amount of the computing resources for the human users, the method comprising:
   providing a resource management service for the computing resources in each of one or more could-based environments, the resource management service including:

a first resource management module measuring load due to human activity in each of the one or more cloud-based environments;

a second resource management module predicting future load due to human activity in each of the one or more cloud-based environments; and a third resource management module determining the computing resources given to the research users in each of the one or more cloud-based environments; and providing a resource control service for the computing resources in each of the one or more cloud-based environments, the resource control service including:

a first resource control module reading a number of computing resources available; and a second resource control module identifying one or more experiments to suspend;

moving the one or more experiments identified to suspend into a <suspending> state;

terminating, by the resource control service in each of the one or more cloud-based environments, processes under control of the resource control service; and saving state information of a trainer running the terminated processes to a remote storage.

2. The method of claim 1, wherein the computing resources are cloud-based game consoles.

3. The method of claim 1, further comprising determining the one or more experiments to suspend based on at least one of a location of the computing resources in use by the one or more experiments, a priority level of the one or more experiments, an age of the one or more experiments, and/or a user ID of the one or more experiments.

4. The method of claim 1, further comprising assigning the resource control service at each environment containing the computing resources, wherein each resource control service monitors for the one or more experiments in the <suspending> state.

5. The method of claim 1, further comprising changing a status of each process under control of the resource control service to a <suspended> state when each process under control of the resource control service is terminated.

6. The method of claim 5, further comprising changing the one or more experiments to a <suspended> state when each of the resource control service at each environment containing the computing resources has its respective processes for the one or more experiments in the <suspended> state.

7. The method of claim 1, further comprising restarting a suspended experiment when the computing resources are determined to be available by the resource management service.

8. The method of claim 7, further comprising selecting the suspended experiment to restart based on at least one of a location of the computing resources in use by the one or more experiments, a priority level of the one or more experiments, an age of the one or more experiments, and/or a user ID of the one or more experiments.

9. The method of claim 7, further comprising smoothing a signal regarding an availability of computing resources to avoid thrashing.

10. The method of claim 1, further comprising providing a user with an option to manually suspend and manually resume an experiment.

11. A method for training an artificial intelligent agent to play a video game on a cloud-based game console shared with human users, comprising:

providing the artificial intelligent agent to interact in the video game;

configuring trainers to review experiences from the artificial intelligent agents and improve policies for the artificial intelligent agents for interacting with the video game;

monitoring a state of the experiment with a resource control service and determining whether to run the experiment once the experiment is in a scheduling state;

starting the experiment on a predetermined number of the cloud-based game consoles, with a predetermined number of the data gatherers, at one or more predetermined environments;

providing a resource management service for monitoring an amount of the cloud-based game consoles available at each of the environments, the resource management service including:

a first resource management module measuring load due to activity of the human users on the cloud-based game consoles at each of the environments;

a second resource management module predicting future load due to activity of the human users; and a third resource management module determining the cloud-based game consoles given to the research users;

reading, by the resource control system, a number of the cloud-based game consoles available;

identifying, by the resource control system, one or more experiments to suspend; and moving the one or more experiments identified to suspend into a <suspending> state.

12. The method of claim 11, further comprising determining the one or more experiments to suspend based on at least one of a location of the cloud-based game console in use by the one or more experiments, a priority level of the one or more experiments, an age of the one or more experiments, and/or a user ID of the one or more experiments.

13. The method of claim 11, further comprising assigning the resource control service at each environment containing the cloud-based game console, wherein each resource control service monitors for the one or more experiments in the <suspending> state.

14. The method of claim 13, further comprising:

terminating each process under control of the resource control service for the one or more experiments in the <suspending> state;

changing a status of each process under control of the resource control service to a <suspended> state when each process under control of the resource control service is terminated; and changing the one or more experiments to a <suspended> state when each of the resource control service at each environment containing the computing resources has its respective processes for the one or more experiments in the <suspended> state.

15. The method of claim 14, further comprising saving state information into a remote storage before terminating each process.

16. The method of claim 14, further comprising restarting a suspended experiment when the computing resources are determined to be available by the resource management service.

17. A method for managing computing resources of cloud-based game consoles between human users and research users to ensure a sufficient amount of cloud-based game consoles for the human users, the method comprising:

providing a resource management service for the computing resources, the resource management service including:
- a first resource management module measuring load due to human activity;
- a second resource management module predicting future load due to human activity; and
- a third resource management module determining the computing resources given to the research users; and providing a resource control service for the computing resources, the resource control service including:
- a first resource control module reading a number of computing resources available; and
- a second resource control module identifying one or more experiments to suspend;

moving the one or more experiments identified to suspend into a <suspending> state;

assigning the resource control service at each environment containing the cloud-based game consoles, wherein each resource control service monitors for the one or more experiments in the <suspending> state;

terminating each process under control of the resource control service for the one or more experiments in the <suspending> state;

saving state information of a trainer running the terminated processes to a remote storage;

changing a status of each process under control of the resource control service to a <suspended> state when each process under control of the resource control service is terminated; and changing the one or more experiments to a <suspended> state when each of the resource control service at each environment containing the computing resources has its respective processes for the one or more experiments in the <suspended> state.

18. The method of claim 17, further comprising determining the one or more experiments to suspend based on at least one of a location of the cloud-based game console in use by the one or more experiments, a priority level of the one or more experiments, an age of the one or more experiments, and/or a user ID of the one or more experiments.

* * * * *